(12) United States Patent
Zhang

(10) Patent No.: US 7,536,801 B2
(45) Date of Patent: May 26, 2009

(54) LASER LEVELING DEVICE

(75) Inventor: Yuexiang Zhang, Nanjing (CN)

(73) Assignee: Chervon Limited (CN)

( * ) Notice: Subject to any disclaimer, the term of this patent is extended or adjusted under 35 U.S.C. 154(b) by 0 days.

(21) Appl. No.: 11/986,888

(22) Filed: Nov. 27, 2007

(65) Prior Publication Data
US 2008/0120854 A1    May 29, 2008

(30) Foreign Application Priority Data
Nov. 27, 2006    (CN) .................. 2006 2 0125817 U

(51) Int. Cl.
*G01C 9/00*    (2006.01)
*G01C 5/00*    (2006.01)
(52) U.S. Cl. .................. 33/451; 33/286; 33/DIG. 21
(58) Field of Classification Search .................. 33/286, 33/451, 379, DIG. 21, 281–283, 285, 381–390, 33/227–228
See application file for complete search history.

(56) References Cited

U.S. PATENT DOCUMENTS

| 5,713,135 | A | * | 2/1998 | Acopulos | 33/451 |
| 5,842,282 | A | * | 12/1998 | Ting | 33/227 |
| 6,163,969 | A | * | 12/2000 | Jan et al. | 33/282 |

* cited by examiner

*Primary Examiner*—Yaritza Guadalupe-McCall
(74) *Attorney, Agent, or Firm*—McDermott Will & Emery LLP

(57) ABSTRACT

A laser leveling device as disclosed in the present invention comprises a body and a power source. The body has a cavity for containing a laser module which is movable between a first position and a second position. When in the first position, the laser module is located within the cavity and is not connected to the power source; and when in the second position, the laser module is located outside of the cavity and the laser is electrically connected to the power source to emit a visible laser beam.

18 Claims, 5 Drawing Sheets

LASER LEVELING DEVICE

CROSS-REFERENCE TO RELATED APPLICATION

This application claims priority under 35 U.S.C. § 119 of Chinese Application 200620125817.2, filed Nov. 27, 2006, which is hereby incorporated by reference.

FEDERALLY SPONSORED RESEARCH OR DEVELOPMENT

Not Applicable.

FIELD OF THE INVENTION

The present invention relates to a laser device and more particularly to a device which is capable of projecting a laser beam onto an object such as to produce a visible laser mark for leveling the object.

BACKGROUND OF THE INVENTION

A laser leveling device usually comprises a laser module disposed within a casing for emitting a laser beam, a series of battery cells received in the casing for supplying power to the laser module, and a trigger switch located on the casing and is operable by the user to switch the laser on or off.

When a laser leveling device is used in a dusty environment, the laser module can easily get dirty because of being exposed out of the casing.

SUMMARY OF THE PRESENT INVENTION

An object of the present invention is to provide a laser leveling device which is convenient for use, and has a laser module, which is protected from dust and other debris.

To achieve this object, the present invention provides a laser leveling device which comprises a body having a cavity, a power source, and a laser module which is movable at least between a first position and a second position, the laser module comprising a laser unit for emitting a laser beam; wherein when the laser module is at a first position, the laser unit is received within said cavity and disconnected to the power source; and wherein the laser module is in a second position, the laser unit is located out of the cavity, and is automatically electrically connected to the power source for emitting a visible laser beam.

With such a structure, the laser module is protected from getting dirty when it is not in use. And when the laser module is moved out of the cavity, a laser beam is switched on automatically, which facilitates operation.

DETAILED DESCRIPTION OF PREFERRED EMBODIMENTS

Figure 1:
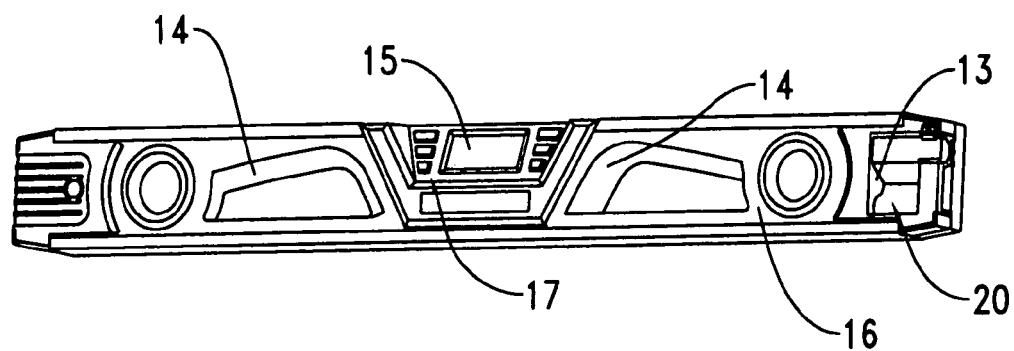
FIG. 1 is a front view of a laser leveling device according to the present invention.
Figure 2:
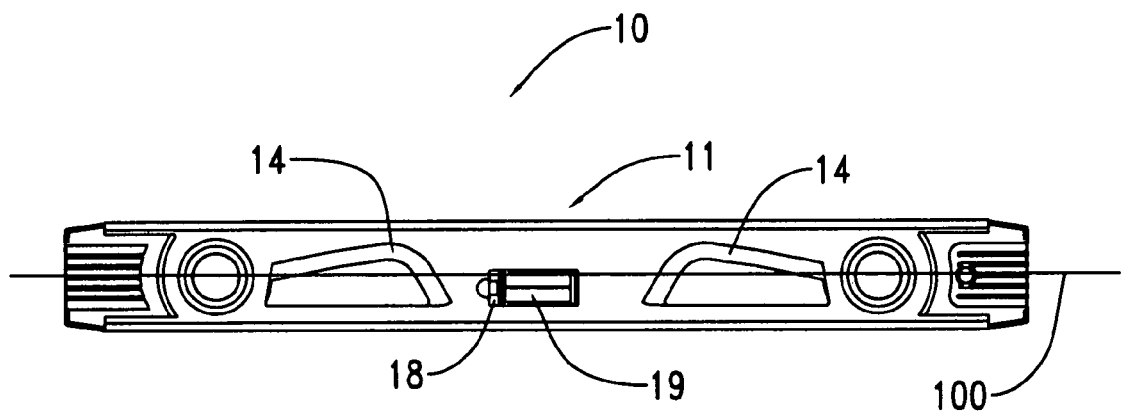
FIG. 2 is a back view of the laser leveling device shown in FIG. 1.

In one embodiment of the present invention, a laser leveling device 10 is a spirit level. With reference to FIG. 1, the laser leveling device 10 comprises an elongated body 11 which has a longitudinal axis 100, and a pair of grips 14 for users to hold thereon. A laser module 20 is located in a cavity 13 defined at one end of the laser leveling device 10. A display 15 is mounted on a surface 16 of the laser leveling device 10. A series of keys 17 are arranged adjacent to the display 15 for controlling the laser leveling device 10. As shown in FIG. 2, there is a chamber 18 defined in the body 11 of the laser leveling device 10 for receiving battery cells 19 which are used to supply power to the laser module 20.

Figure 3:
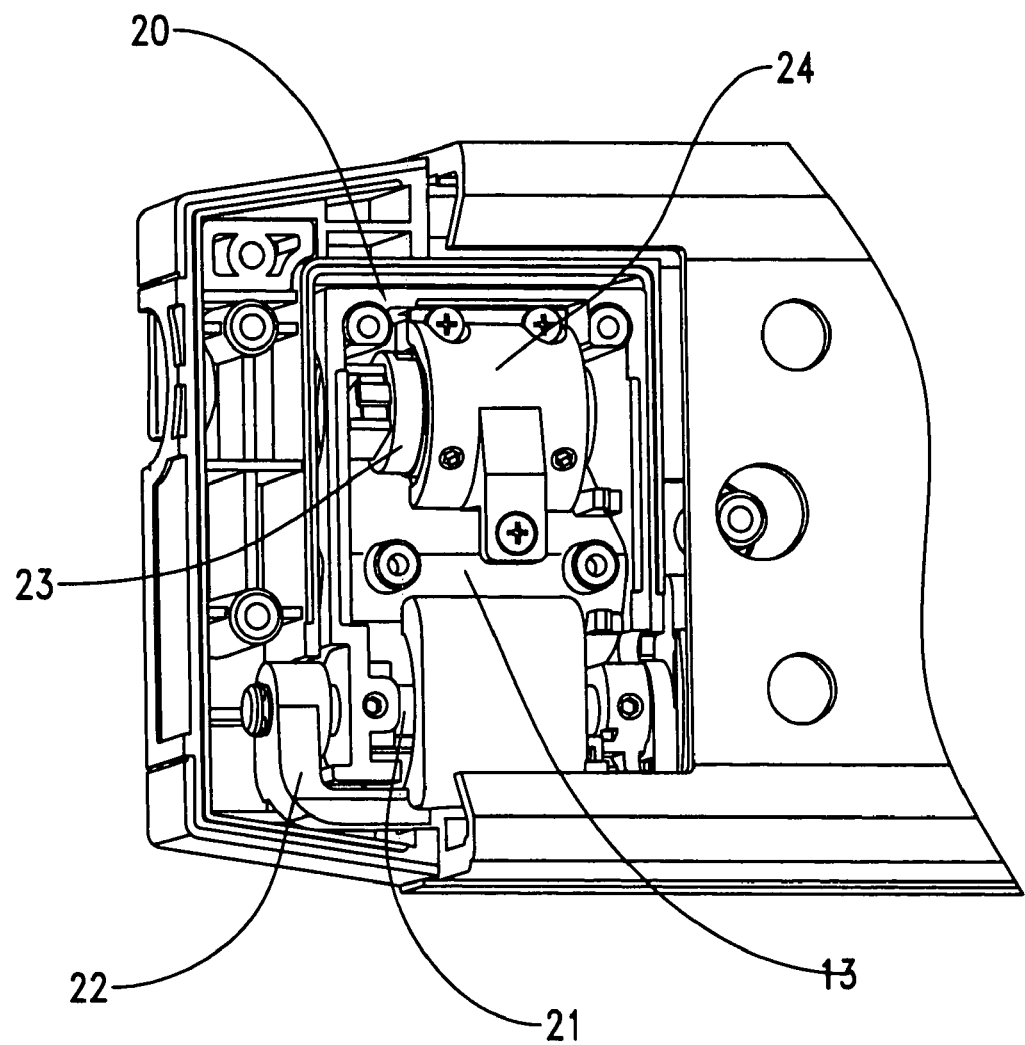
FIG. 3 is a view showing the internal structure of the laser leveling device shown in FIG. 1.

FIG. 3 shows a detailed assembly of the laser module 20. A bracket 22 is mounted in the cavity 13. A shaft 21 is rotatably mounted on the bracket 22 and is substantially parallel to the axis 100 of the body 11. The laser module 20 is secured to the shaft 21 in an operable manner such that it can rotate about the longitudinal axis of the shaft 21 together with the shaft 21. A laser unit 23 is fixedly mounted on the laser module 20 by a support 24. The laser module 20 is movable between at least a first position and a second position, while at the first position the laser unit 23 is located inside the cavity 13, and at the second position it is rotated about the longitudinal axis of shaft 21 so that it is located outside of the cavity 13.

The component and assembly of the laser module 20 is not limited to that as described above. In another embodiment, the shaft 21 can be fixed on the bracket 22, and the laser module 20 can rotate about the shaft 21. In an alternative embodiment not shown, the shaft 21 need not be parallel to the axis 100 of the body. And in other embodiments, the laser module 20 is slidably (rather than rotatably) mounted to laser leveling device 10.

Figure 6:
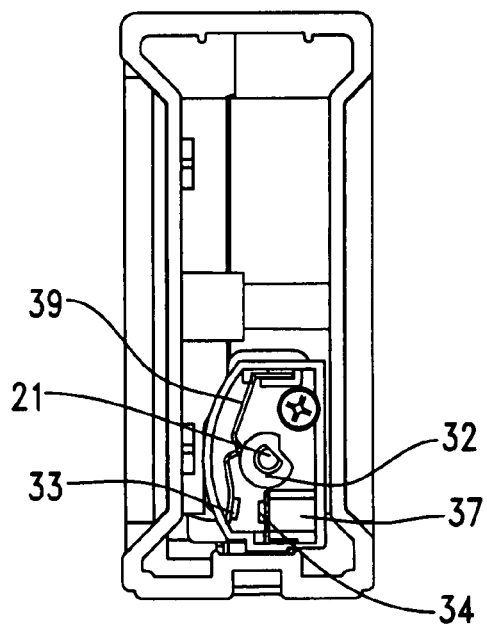
FIG. 6 is a cross-sectional view taken along line A-A shown in FIG. 5.

The laser module 20 further comprises a switch actuator and a switch-off device mounted in the laser leveling device 10. As shown in FIG. 6, the switch actuator comprises a leaf spring 39 with a protrusion 33 which is biased to act on a contact terminal 34 to turn on the switch 37. In this embodiment, the switch-off device is a cam 32.

Figure 4:
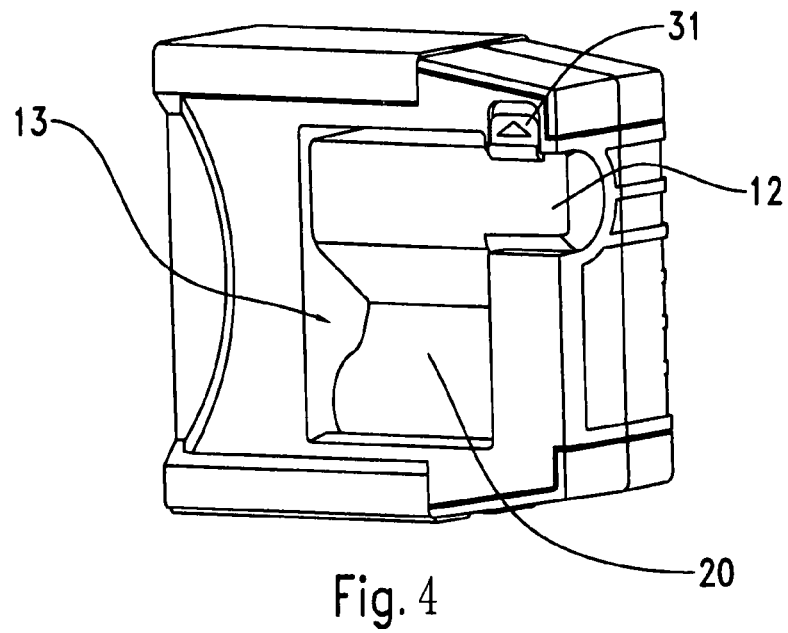
FIG. 4 is a perspective view of a portion of the laser leveling device wherein the laser module is located within the cavity.
Figure 5:
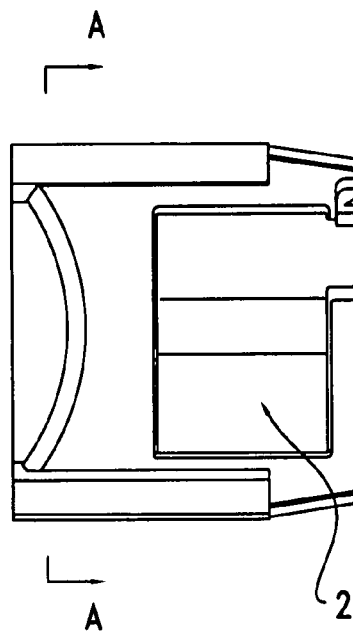
FIG. 5 is a side view of a portion of the laser leveling device.

Referring to FIG. 4, a locking member 31 secures the laser module 20 in a first position, in which the laser unit 23 is positioned within the cavity 13. Referring to FIG. 6, the cam 32 is mounted on the shaft 21, and the leaf spring 39 is pushed by the cam 32 such that the protrusion 33 is separated from the contact terminal 34. Accordingly the battery cells 19 and the laser unit 23 are not electrically connected in the first position and the laser unit 23 does not emit a laser beam.

Figure 7:
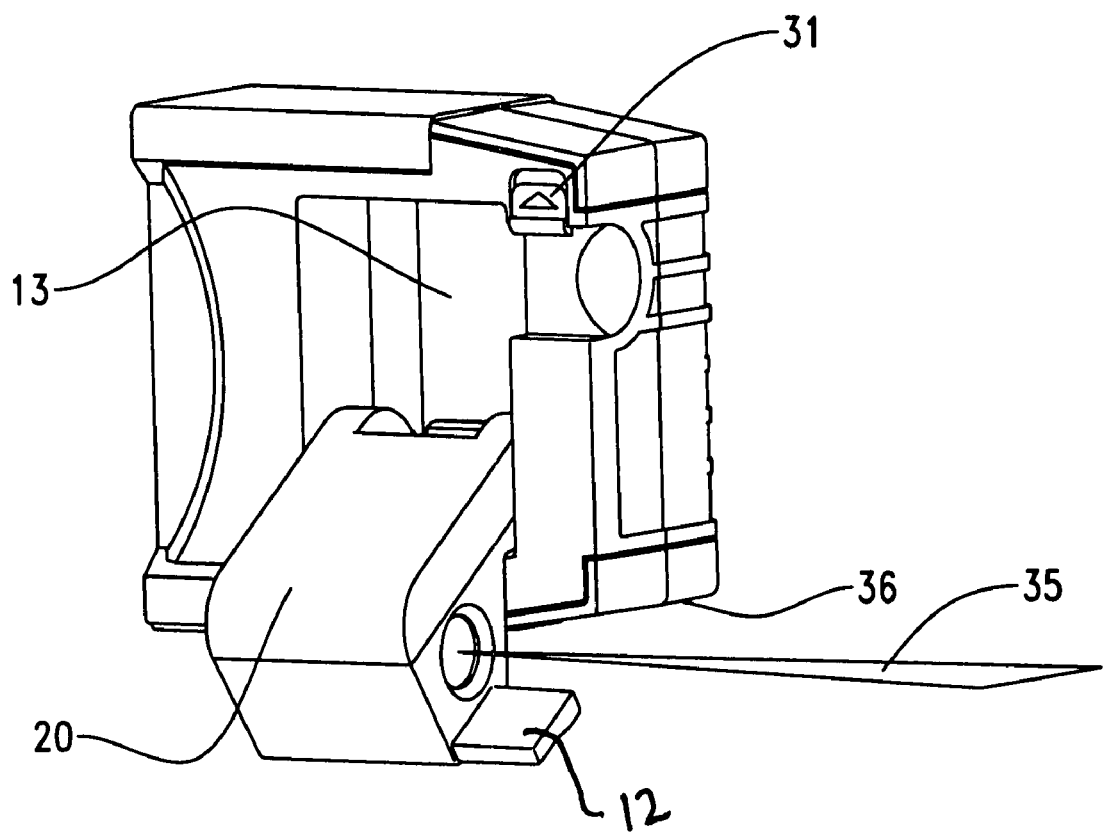
FIG. 7 is a perspective view of a portion of the laser leveling device wherein the laser module is located outside of the cavity.
Figure 8:
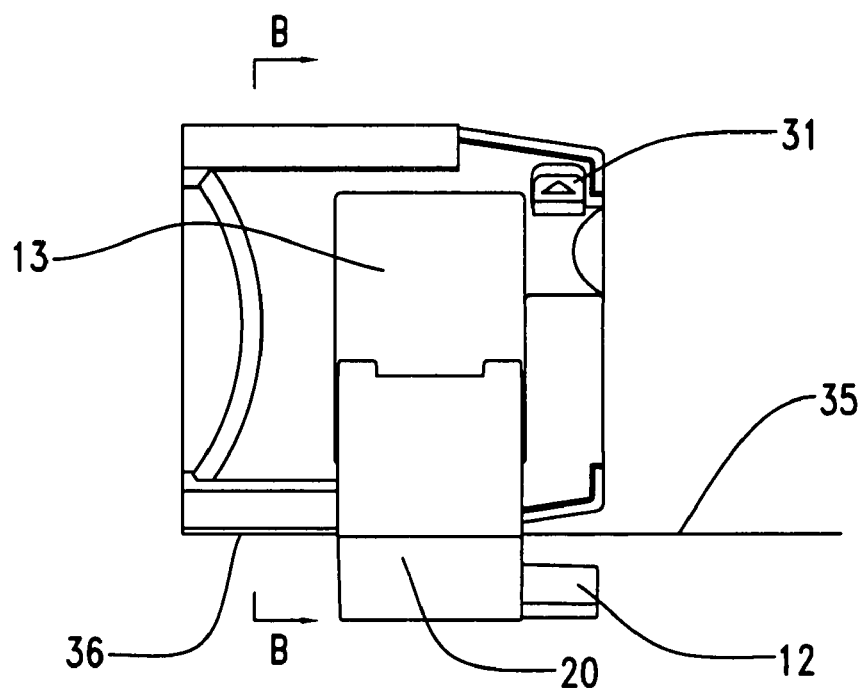
FIG. 8 is another view showing the laser module located outside of the laser leveling device.
Figure 9:
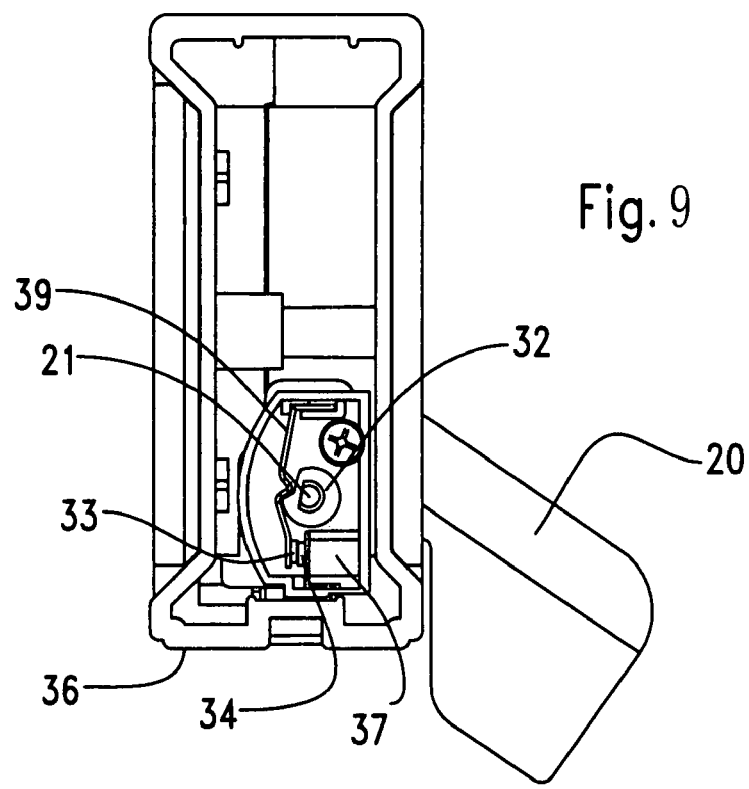
FIG. 9 is a cross-sectional view taken along line B-B shown in FIG. 8.

In the second position, the locking member 31 is forced upward and the laser module 20 can be moved out of the cavity 13 by turning a knob 12 of the laser module 20. With reference to FIGS. 7-9, the laser device 20 rotates to the position shown in FIG. 9 together with the cam 32. As the cam 32 rotates, the leaf spring 39 moves to a position where the protrusion 33 makes contact with the contact terminal 34. As a result, the laser unit 23 (which includes a laser diode) is electrically connected to the battery cells 19 and emits a fan-shaped laser beam 35. The fan-shaped laser beam 35 lies in a same plane with a bottom surface 36 of the laser leveling device 10, and the emitting direction of the laser beam 35 is generally parallel to the longitudinal axis 100 of the body 11. In another embodiment, the laser unit 23 may emit a cylindrical laser beam as well, which forms a point on a surface rather than a line.

In other embodiments, the switch assembly is comprised of two conductive terminals for electrically connecting the battery cells 19 and laser unit 23. Rotation of the cam 32 to different positions makes the conductive terminals connect or disconnect with each other so as to provide electrical power to the laser module 23 to emit a laser beam or not accordingly.

In another embodiment, an elastic member, such as a torsion spring, is mounted between the laser module 20 and the body 11. When the laser module 20 is moved out of the cavity, the elastic member is biased to a second position when the locking member 31 is released and the laser module 20 is automatically moved to the second position where the contact terminals are connected to facilitate operation of the laser.

The above described preferred embodiments are intended to illuminate the principle of the present invention, but not to limit its scope. It can be easily understood for those skilled in the art that many other modifications and variations of these preferred embodiments will be apparent and may be made without departing from the spirit and the scope of the invention as defined in the following claims.

I claim:

1. A laser leveling device, comprising:
   a body having a cavity formed therein;
   a power source;
   a laser module which is movable between a first position and a second position, the laser module comprising a laser unit for emitting a laser beam;
   wherein when the laser module is in the first position, the laser unit is positioned within said cavity and disconnected from the power source; and wherein the laser module is in the second position, the laser unit is positioned outside the cavity and the laser unit is automatically electrically connected to the power source for emitting a visible laser beam from the laser unit.

2. A laser leveling device as claimed in claim 1, wherein the body is elongated and has a bottom surface and a longitudinal axis and wherein the emitted laser beam lies in a same plane with said bottom surface of the body and parallel to the longitudinal axis of the body.

3. A laser leveling device as claimed in claim 2, wherein the laser beam is fan-shaped.

4. A laser leveling device as claimed in claim 1, further comprising a switch actuator and a switch-off device, wherein when the laser module is moved to the first position, the switch-off device acts on the switch actuator to prevent the switch from contacting the power source.

5. A laser leveling device as claimed in claim 4, wherein the switch actuator comprises an elastic member.

6. A laser leveling device as claimed in claim 5, wherein the switch-off device is a cam and the elastic member is biased on the cam.

7. A laser leveling device as claimed in claim 1, further comprising a locking member for securing the laser module at the first position.

8. A laser leveling device as claimed in claim 1, wherein an elastic member is biased between the laser module and the body for moving the laser module to the second position.

9. A laser leveling device as claimed in claim 1, wherein the laser module comprises a knob.

10. A laser leveling device as claimed in claim 1, wherein the laser module is rotatable from the first position to the second position.

11. A laser leveling device as claimed in claim 1, wherein the laser module is slidable from the first position to the second position.

12. A laser leveling device comprising:
    an elongated body having a cavity formed therein;
    a power source;
    a laser module with a laser unit for emitting a laser beam, the laser module having a first position wherein the laser module is positioned within the cavity in the body and the laser unit is disconnected from the power source, and a second position wherein the laser module is positioned outside the cavity in the body and the laser unit is connected to the power source.

13. A laser leveling device as claimed in claim 12, wherein the laser module is rotatably coupled to a shaft positioned within the cavity.

14. A laser leveling device as claimed in claim 13 further comprising a switch assembly having a switch actuator and a cam.

15. A laser leveling device as claimed in claim 14, wherein the cam is connected to the shaft and when the shaft is rotated, the cam applies a force to the switch actuator to electrically connect the laser unit to the power source.

16. A laser leveling device as claimed in claim 12, wherein the laser unit comprises a laser diode for emitting a fan-shaped laser beam.

17. A laser leveling device as claimed in claim 16, wherein the body has a bottom surface and a longitudinal axis and the fan-shaped laser beam lies in a same plane with the bottom surface of the body of the laser leveling device.

18. A laser leveling device as claimed in claim 16, wherein the fan-shaped laser beam is projected in a direction generally parallel to the longitudinal axis of the body of the laser leveling device.

* * * * *